United States Patent
Zhang

(10) Patent No.: US 11,681,005 B2
(45) Date of Patent: Jun. 20, 2023

(54) VEHICLE LOCATION SYSTEMS

(71) Applicant: Rivian IP Holdings, LLC, Plymouth, MI (US)

(72) Inventor: Qian Zhang, San Diego, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 336 days.

(21) Appl. No.: 16/944,917

(22) Filed: Jul. 31, 2020

(65) Prior Publication Data

US 2022/0034988 A1 Feb. 3, 2022

(51) Int. Cl.
*H04B 7/00* (2006.01)
*G01S 1/08* (2006.01)
*H04B 17/318* (2015.01)
*H04W 4/40* (2018.01)
*H04W 4/80* (2018.01)

(52) U.S. Cl.
CPC .............. *G01S 1/08* (2013.01); *H04B 17/318* (2015.01); *H04W 4/40* (2018.02); *H04W 4/80* (2018.02)

(58) Field of Classification Search
CPC .......... G01S 1/08; H04B 17/318; H04W 4/80; H04W 4/40
USPC ................................ 701/300; 455/41.2, 41.1
See application file for complete search history.

(56) References Cited

U.S. PATENT DOCUMENTS

| | | | |
|---|---|---|---|
| 11,140,514 B2* | 10/2021 | Salter | H04W 4/023 |
| 11,422,222 B2* | 8/2022 | Mänken | G01S 1/08 |
| 2014/0315571 A1* | 10/2014 | Saari | H04W 4/029 455/456.1 |
| 2018/0189766 A1* | 7/2018 | Batten | G07F 13/025 |
| 2020/0134332 A1* | 4/2020 | Vossoughi | G08G 1/065 |
| 2020/0184518 A1* | 6/2020 | Bains | G06Q 10/00 |
| 2020/0389582 A1* | 12/2020 | Herman | H04N 23/73 |

* cited by examiner

*Primary Examiner* — April G Gonzales
(74) *Attorney, Agent, or Firm* — Clements Bernard Walker; Christopher L. Bernard

(57) ABSTRACT

Disclosed embodiments include vehicle locating systems and vehicles locatable by vehicle locating systems. An illustrative vehicle locating system includes a first Bluetooth Low Energy (BLE) beacon having a first location associated therewith and configured to receive a first radio frequency signal from a vehicle and coded with vehicle identification information. The first BLE beacon may be further configured to calculate a first proximity of the vehicle to the first BLE beacon and send to a server a first proximity signal indicative of the first proximity. A second BLE beacon has a second location associated therewith and is configured to receive a second radio frequency signal from the vehicle and coded with the vehicle identification information. The second BLE beacon may be further configured to calculate a second proximity of the vehicle to the second BLE beacon and send to the server a second proximity signal representative of the second proximity.

19 Claims, 5 Drawing Sheets

VEHICLE LOCATION SYSTEMS

INTRODUCTION

The present disclosure relates to vehicle locating systems for finding vehicles within areas such as parking facilities. The statements in this section merely provide background information related to the present disclosure and may not constitute prior art.

It has long been a problem, especially in large multi-story parking garages, to locate a vehicle if a driver forgets where the driver has parked the vehicle. One way this has been handled is to provide paper tickets telling the driver on what level the driver has parked. Another method is merely marking each space with a label so that a driver may either commit it to memory, write it down, or take a picture of it. All of these methods have one major drawback—if the driver forgets to act in one of the ways available to remember or record the parking space, then the driver often has a difficult time locating the vehicle.

Other electronic solutions exist for locating a vehicle. However, most of those require special beacons and receivers purchased and installed by the vehicle owner. In many cases the vehicle may already have transceivers which may be capable of aiding in locating the vehicle. However, such transceivers are not typically used for that task.

SUMMARY

Disclosed embodiments include vehicle locating systems for finding vehicles within areas such as parking facilities and vehicles locatable by vehicle locating systems.

In an illustrative embodiment a vehicle locating system includes a first Bluetooth Low Energy (BLE) beacon having a first location associated therewith. The first BLE beacon may be configured to receive a first radio frequency signal from a vehicle, the first radio frequency signal being coded with vehicle identification information. The first BLE beacon may be further configured to calculate a first proximity of the vehicle to the first BLE beacon and send to a server a first proximity signal indicative of the first proximity. The system also includes a second BLE beacon having a second location associated therewith. The second BLE beacon may be configured to receive a second radio frequency signal from the vehicle, the second radio frequency signal being coded with the vehicle identification information. The second BLE beacon may be further configured to calculate a second proximity of the vehicle to the second BLE beacon and send to the server a second proximity signal representative of the second proximity.

In another illustrative embodiment a vehicle locating system includes a first Bluetooth Low Energy (BLE) beacon having a first location associated therewith. The first BLE beacon may be configured to receive a first radio frequency signal from a vehicle, the first radio frequency signal being coded with vehicle identification information. The first BLE beacon may be further configured to calculate a first proximity of the vehicle to the first BLE beacon and send to a server a first proximity signal indicative of the first proximity. The system also includes a second BLE beacon having a second location associated therewith. The second BLE beacon may be configured to receive a second radio frequency signal from the vehicle, the second radio frequency signal being coded with the vehicle identification information. The second BLE beacon may be further configured to calculate a second proximity of the vehicle to the second BLE beacon and send to the server a second proximity signal representative of the second proximity. Further still, the vehicle locating system includes a server configured to receive the first proximity signal and the second proximity signal, the server being further configured to select a BLE beacon with a smallest proximity.

In another illustrative embodiment a vehicle has a body structure forming a cabin and with a propulsion system and at least one wheel coupled to and driven by the propulsion system. The at least one wheel is coupled to the body structure. The vehicle also includes a Bluetooth Low Energy (BLE) transceiver disposed in the vehicle. The BLE transceiver may be configured to receive a first BLE scan request from a first BLE beacon having a first location associated therewith and transmit a first BLE signal coded with vehicle identification information responsive to the first BLE scan request. The BLE transceiver may be further configured to receive a second BLE scan request from a second BLE beacon having a second location associated therewith and to transmit a second BLE signal coded with the vehicle identification information responsive to the second BLE scan request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
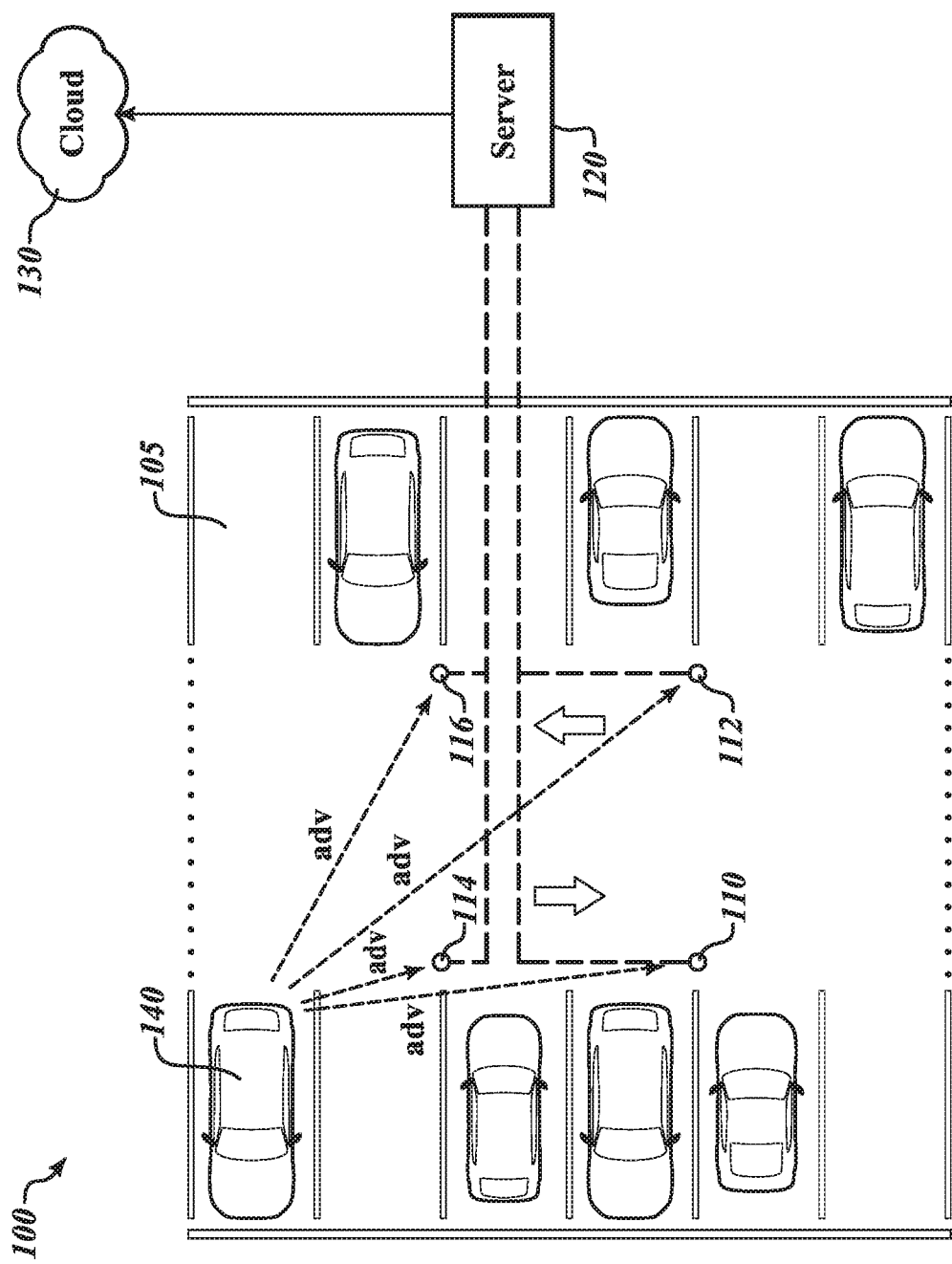
FIG. 1 is a block diagram in partial schematic form of an illustrative vehicle location system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, in various embodiments an illustrative vehicle locating system 100 is depicted. A parking garage area 105 is shown as having Bluetooth Low Energy (BLE) beacons 110, 112, 114, 116 installed at various locations. It will be appreciated that many newer vehicles are equipped with BLE sensors (that are configured to communicate with BLE beacons) built into the vehicle and other vehicles may easily be equipped with such BLE sensors, thereby enabling many vehicles to use the systems disclosed therein.

In various embodiments the parking garage may be a multi-story parking garage and the BLE beacons 110, 112, 114, and 116 may be installed at various locations on various (and, if desired, all) levels of the parking garage. The BLE beacons 110, 112, 114, and 166 depicted are shown as an illustrative example. The distribution and number of BLE beacons is not limited to those shown. Any number of beacons and various locations of the BLE beacons may be used. Location of the BLE beacons is not limited to a parking garage but may be any location as desired for a particular application.

In various embodiments, a first Bluetooth Low Energy (BLE) beacon 110 has a first location associated therewith. The first BLE beacon 110 is configured to receive a first radio frequency signal from a vehicle 140. The first radio frequency signal may be coded with the vehicle 140 identification information and sent out as an "advertisement" (adv). The first BLE beacon 110 is configured to calculate a first proximity of the vehicle to the first BLE beacon and is configured to send, to a server 120, a first proximity signal indicative of the first proximity.

Similarly, a second BLE beacon 112 has a second location associated therewith. The second BLE beacon 112 is configured to receive a second radio frequency signal from the vehicle. The second radio frequency signal may be coded with the vehicle 140 identification information. The second BLE beacon may be configured to calculate a second proximity of the vehicle 140 to the second BLE beacon 112 and send to the server 120 a second proximity signal representative of the second proximity. Other BLE beacons, including, but not limited to the BLE beacons 114 and 116, operate similar to the BLE beacons 112 and 114.

In various embodiments, the server 120 may be configured to select the BLE beacon with a smallest proximity. This information may be provided to the cloud and communicated over any of a variety of wireless networks to a driver of vehicle 140. For example, if the driver is trying to locate where the driver parked the vehicle 140, the driver may check an app, or other information source, running on the driver's mobile phone or other mobile device, which indicates the location of the vehicle communicated by the server 120.

In accordance with various embodiments any of a variety of vehicle identifiers may be advertised by vehicles including but not limited to a Vehicle Identification Number (VIN), a license plate number, and a customized identifier, etc. Various methodologies may exist for determining proximity of vehicles to BLE beacons. For example, the proximity may be determined based on a Received Signal Strength Indicator (RSSI). This RSSI calculation may further be improved by also using Measured Power in the calculation.

As is known, RSSI is the strength of the beacon's signal as seen on the receiving device, e.g. the BLE receiver in the vehicle 140. The signal strength depends on distance and Broadcasting Power value. At maximum Broadcasting Power (e.g., +4 dBm) the RSSI ranges from, e.g., −26 (a few inches) to −100 (40-50 m distance).

RSSI is used to approximate distance between the device and the beacon using another value defined by the iBeacon standard, called Measured Power. In one example, distance may be calculated by the following:

$$\text{Distance} = 10^{((\text{Measured Power} - \text{RSSI})/(10*N))}$$

where,

N is a Constant that depends on an Environmental factor, the range being 2-4 Measured Power is also known as the 1 Meter RSSI.

For an illustrative example N=2, Measured Power≈−58 dBm, RSSI=−70,

Which yields $$\text{Distance} = 10^{0.6} = 4 \text{ meter.}$$

This example calculation is for example only and should not be viewed as limiting as any of a variety of methodologies and calculations may be used.

Figure 2:
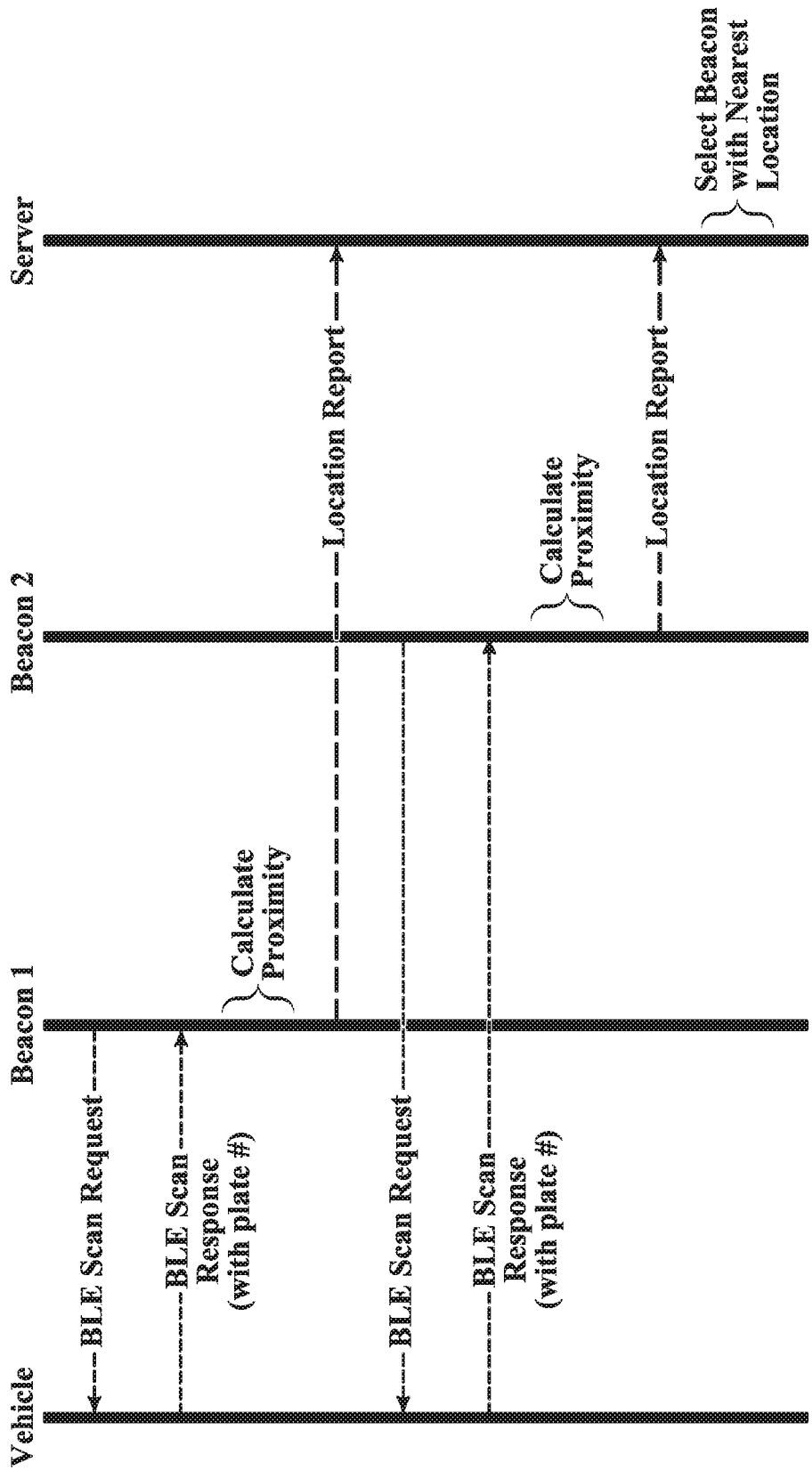
FIG. 2 is a signal flow diagram for the vehicle location system of FIG. 1.

Referring now to FIG. 2, a signal flow of vehicle location detection is depicted. As can be seen a Beacon 1 provides a Scan request. In response, the vehicle responds with Vehicle Identification, such as but not limited to the License Plate number. A proximity may then be calculated and reported to the server. Beacon 2 also provides a Scan request. In response, the vehicle responds with Vehicle Identification. A proximity may then be calculated and reported to the server. The server, after receiving all of the reported proximities determines the beacon with the Nearest location to the vehicle and then reports that to a driver's mobile phone or other device.

Figure 3:
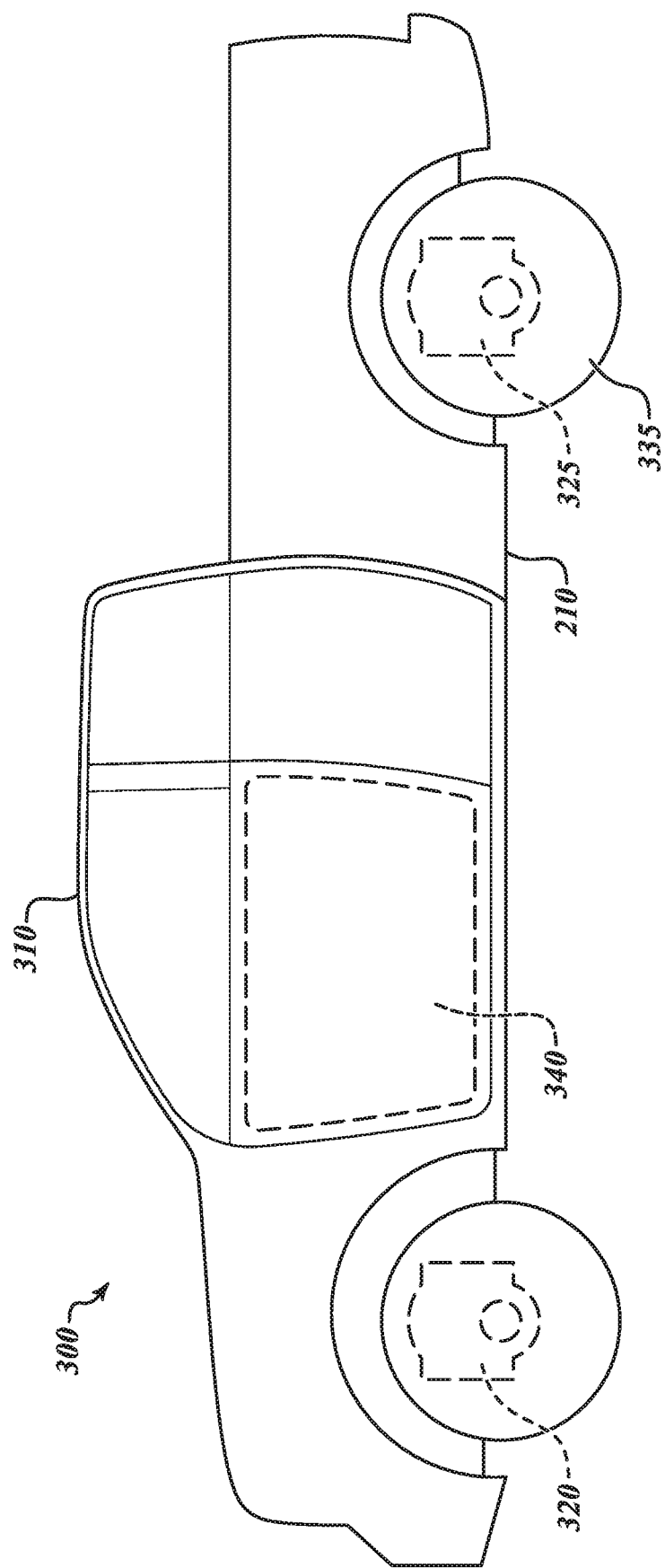
FIG. 3 is a side plan view in partial schematic form of an illustrative vehicle with vehicle locating hardware.

Referring now to FIG. 3, an illustrative vehicle 300 is depicted. In various embodiments the Vehicle 300 includes a body structure 310 forming a cabin on a chassis 210. The vehicle 300 also includes a propulsion system. In some embodiments the propulsion system may include one or more electric motors such as electric motors 320 and 325 that are configured to drive wheels of the vehicle such as wheels 335. However, in some other embodiments the vehicle 300 may include a propulsion system that includes an engine that burns a fossil fuel such as gasoline, diesel fuel, or the like.

In various embodiments the vehicle 300 may be equipped with a Bluetooth Low Energy (BLE) transceiver 340 disposed in the vehicle along with any associated electronics and control systems. The BLE transceiver 340 may be configured to receive a first BLE scan request from a first BLE beacon having a first location associated therewith and to transmit a first BLE signal coded with vehicle identification information responsive to the first BLE scan request. The BLE transceiver 340 may be further configured to receive a second BLE scan request from a second BLE beacon having a second location associated therewith and to transmit a second BLE signal coded with the vehicle identification information responsive to the second BLE scan request. This information may be sent to a server which collects information from the set of BLE beacons and communicates location to a cloud server that informs various devices of a vehicle's location.

Figure 4:
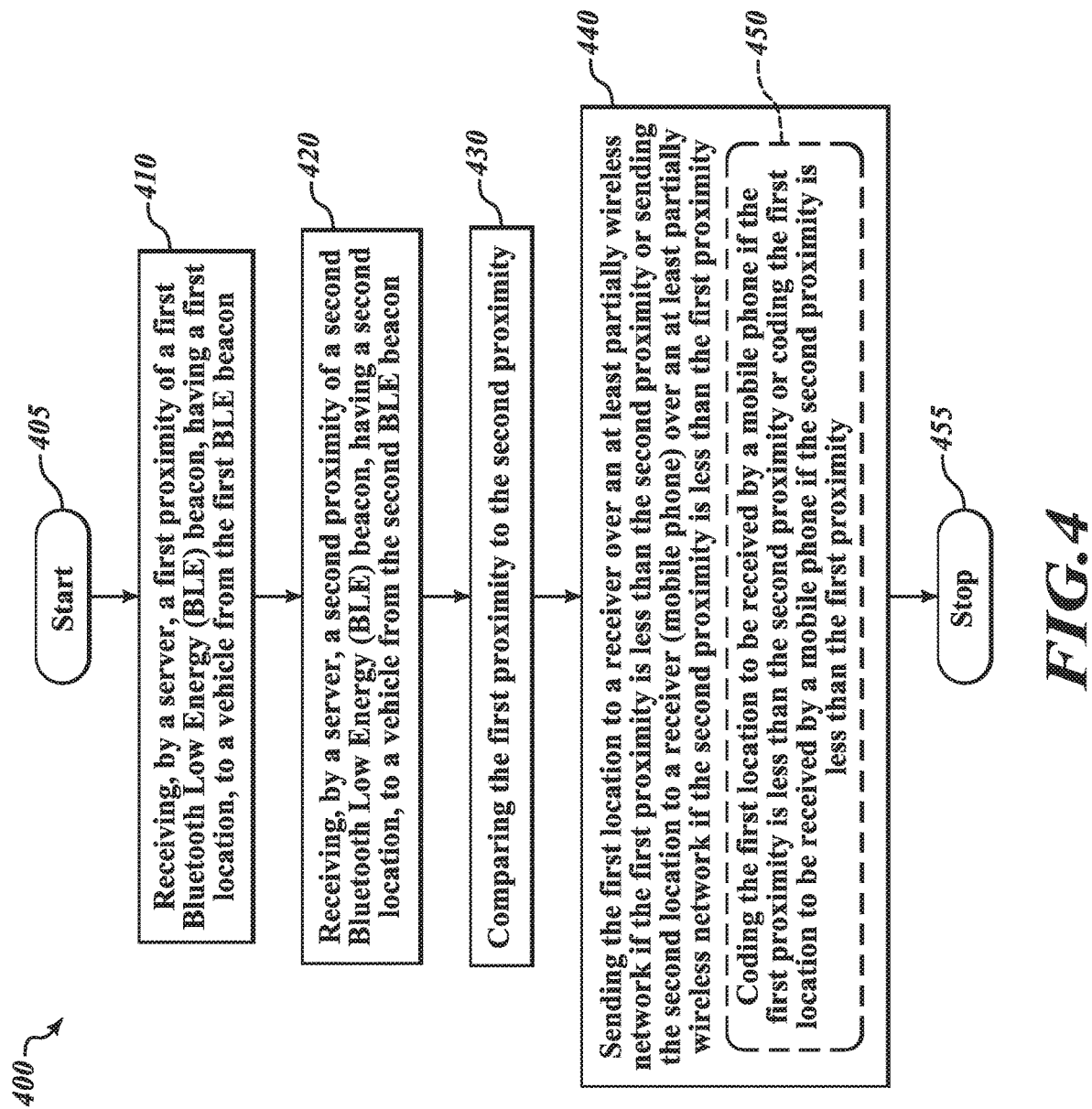
FIG. 4 is a flow chart of an illustrative method of vehicle locating.

Referring now to FIG. 4, in various embodiments an illustrative method 400 starts at a block 405. The method 400 includes at a block 410 receiving, by a server, from a first Bluetooth Low Energy (BLE) beacon having a first location associated therewith, a first proximity of a vehicle to the first BLE beacon. The method 400 also includes at a block 420 receiving, by the server, from a second BLE beacon having a second location associated therewith, a second proximity of the vehicle to the second BLE beacon. Further, the method 400 includes at a block 430 comparing the first proximity to the second proximity and at a block 440 sending the first location to a receiver over an at least partially wireless network responsive to the first proximity being less than the second proximity. The method 400 may also include at a block 450 sending the second location to the receiver over the at least partially wireless network responsive to the second proximity being less than the first proximity. The method 400 ends at a stop block 455. This method is an example of the various embodiments of the method which may be used in implementing the system. Other steps and order of steps may be used in implementing the system.

Figure 5:
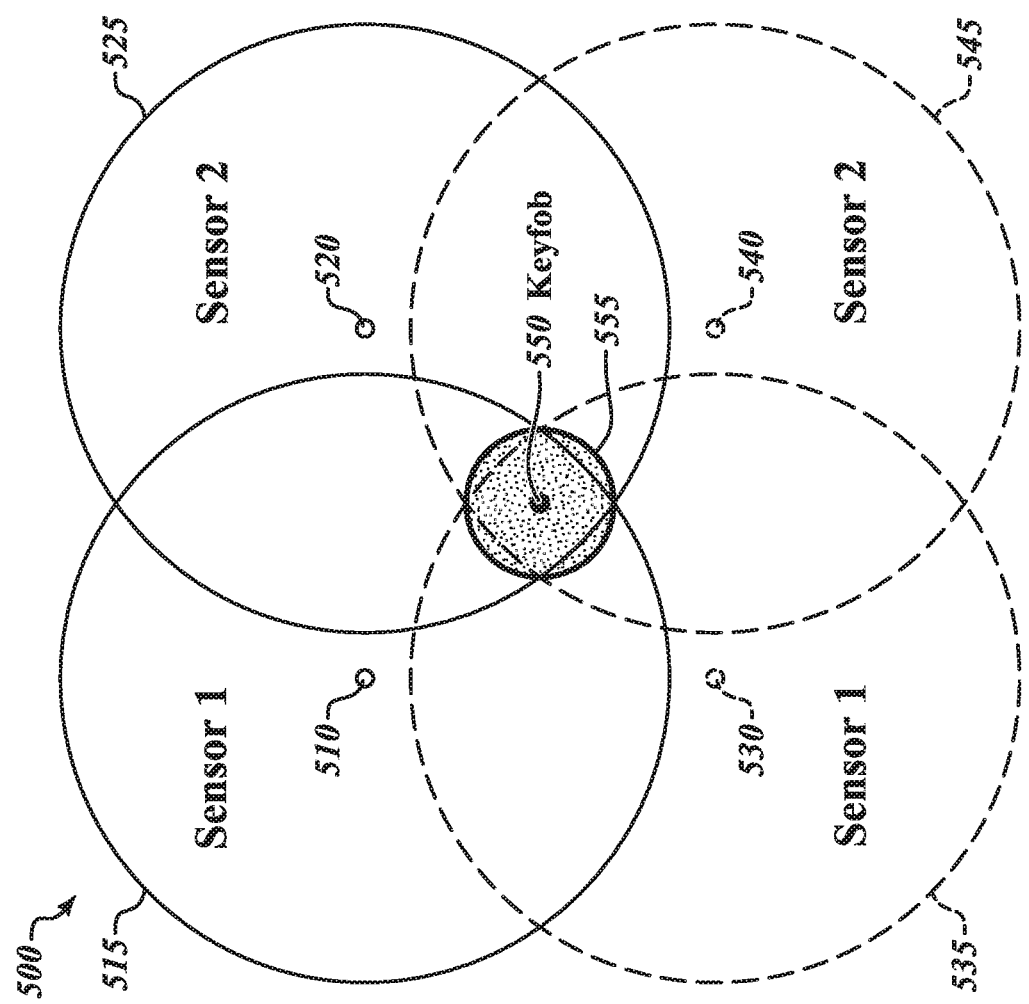
FIG. 5 is an illustrative schematic diagram of relative locations of Bluetooth Low Energy (BLE) beacons relative to a keyfob.

Referring now to FIG. 5, an example of the BLE beacons at relative locations 510 and 520 are able to detect the presence and location of a key fob 550 having BLE capabilities. In the situation where a Sensor 1 has a relative location 510 and Sensor 2 has a relative location 520 relative to the key fob 550, these distances to the key fob 550 are recorded as the fingerprint of the key fob 550 (relative location and time). As the key fob 550 moves relative to Sensor 1 and Sensor 2, Sensor 1 and Sensor 2 are at relative locations 530 and 540 relative to the key fob 550 within a radius of approximation given as a circle 555. Using the fingerprinting previously recorded and the current alteration from Sensor 1 and 2, the system may determine the actual location of the key fob 550 so that an app that is running on a mobile phone or other mobile device may be able to guide a driver to the driver's vehicle based on the known location of the parked vehicle and based on the known location of the key fob 550. The embodiment described here is presented as an example and other methodologies in locating a key fob moving in the parking structure may be used in a similar manner without departing from the scope of the disclosure.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A vehicle locating system comprising:
a first Bluetooth Low Energy (BLE) beacon having a first location associated therewith, the first BLE beacon being configured to receive a first radio frequency signal from a vehicle, the first radio frequency signal being coded with vehicle identification information, the first BLE beacon being further configured to calculate a first proximity of the vehicle to the first BLE beacon and send to a server a first proximity signal indicative of the first proximity; and
a second BLE beacon having a second location associated therewith, the second BLE beacon being configured to receive a second radio frequency signal from the vehicle, the second radio frequency signal being coded with the vehicle identification information, the second BLE beacon being further configured to calculate a second proximity of the vehicle to the second BLE beacon and send to the server a second proximity signal representative of the second proximity;
wherein the server is configured to select a BLE beacon with a smallest proximity and provide a location of the vehicle associated with the smallest proximity to a mobile device of a user disposed outside of the vehicle.

2. The system of claim 1, wherein at least one location chosen from the first location and the second location is within a parking structure.

3. The system of claim 1, wherein at least one radio frequency signal chosen from the first radio frequency signal and the second radio frequency signal includes a BLE signal.

4. The system of claim 1, wherein the vehicle identification information includes information chosen from a Vehicle Identification Number (VIN), a license plate number, and a customized identifier.

5. The system of claim 1, wherein at least one proximity chosen from the first proximity and the second proximity is calculated based on Received Signal Strength Indicator (RSSI).

6. The system of claim 5, wherein at least one proximity chosen from the first proximity and the second proximity is further calculated based on Measured Power.

7. A vehicle locating system comprising:
a first Bluetooth Low Energy (BLE) beacon having a first location associated therewith, the first BLE beacon being configured to receive a first radio frequency signal from a vehicle, the first radio frequency signal being coded with vehicle identification information, the first BLE beacon being further configured to calculate a first proximity of the vehicle to the first BLE beacon and generate a first proximity signal indicative of the first proximity;
a second BLE beacon having a second location associated therewith, the second BLE beacon being configured to receive a second radio frequency signal from the vehicle, the second radio frequency signal being coded with the vehicle identification information, the second BLE beacon being further configured to calculate a second proximity of the vehicle to the second BLE beacon and generate a second proximity signal representative of the second proximity; and
a server configured to receive the first proximity signal and the second proximity signal, the server being further configured to select a BLE beacon with a smallest proximity and provide a location of the vehicle associated with the smallest proximity to a mobile device of a user disposed outside of the vehicle.

8. The system of claim 7, wherein the server is further configured to cause location of the BLE beacon with the smallest proximity to be sent to a receiver over an at least partially wireless network.

9. The system of claim 7, wherein at least one location chosen from the first location and the second location is within a parking structure.

10. The system of claim 7, wherein at least one radio frequency signal chosen from the first radio frequency signal and the second radio frequency signal includes a BLE signal.

11. The system of claim 7, wherein the vehicle identification information includes information chosen from a Vehicle Identification Number (VIN), a license plate number, and a customized identifier.

12. The system of claim 7, wherein at least one proximity chosen from the first proximity and the second proximity is calculated based on Received Signal Strength Indicator (RSSI).

13. The system of claim 12, wherein at least one proximity chosen from the first proximity and the second proximity is further calculated based on Measured Power.

14. The system of claim 7, wherein the smallest proximity is correlated with a location of the vehicle.

15. A vehicle comprising:
a body structure forming a cabin;
a propulsion system;
at least one wheel coupled to and driven by the propulsion system, the at least one wheel coupled to the body structure; and
a Bluetooth Low Energy (BLE) transceiver coupled to the vehicle, the BLE transceiver being configured to receive a first BLE scan request from a first BLE beacon having a first location associated therewith and to transmit a first BLE signal coded with vehicle identification information responsive to the first BLE scan request, the BLE transceiver being further configured to receive a second BLE scan request from a second BLE beacon having a second location associated therewith and to transmit a second BLE signal coded with the vehicle identification information responsive to the second BLE scan request.

16. The vehicle of claim 15, wherein at least one radio frequency signal chosen from the first radio frequency signal and the second radio frequency signal includes a BLE signal.

17. The vehicle of claim 15, wherein the vehicle identification information includes information chosen from a Vehicle Identification Number (VIN), a license plate number, and a customized identifier.

18. The vehicle of claim 15, wherein at least one proximity chosen from the first proximity and the second proximity is calculated based on Received Signal Strength Indicator (RSSI).

19. The vehicle of claim 18, wherein at least one proximity chosen from the first proximity and the second proximity is further calculated based on Measured Power.

* * * * *